United States Patent
Li et al.

(10) Patent No.: US 12,140,330 B2
(45) Date of Patent: Nov. 12, 2024

(54) CONTROL METHOD AND APPARATUS FOR WATER PUMPS IN AIR CONDITIONING SYSTEM, AND AIR CONDITIONING SYSTEM

(71) Applicants: Shanghai Meicon Intelligent Construction Co., Ltd., Shanghai (CN); GD Midea Heating & Ventilating Equipment Co., Ltd., Foshan (CN)

(72) Inventors: Yuanyang Li, Shanghai (CN); Yide Qiu, Shanghai (CN)

(73) Assignees: SHANGHAI MEICON INTELLIGENT CONSTRUCTION CO., LTD., Shanghai (CN); GD MIDEA HEATING & VENTILATING EQUIPMENT CO., LTD., Foshan (CN)

( * ) Notice: Subject to any disclaimer, the term of this patent is extended or adjusted under 35 U.S.C. 154(b) by 539 days.

(21) Appl. No.: 17/489,486

(22) Filed: Sep. 29, 2021

(65) Prior Publication Data
US 2022/0018564 A1    Jan. 20, 2022

Related U.S. Application Data

(63) Continuation of application No. PCT/CN2020/078842, filed on Mar. 11, 2020.

(30) Foreign Application Priority Data

Jul. 12, 2019    (CN) .......................... 201910630396.0

(51) Int. Cl.
*F24F 11/46*    (2018.01)
*G05B 17/02*    (2006.01)

(52) U.S. Cl.
CPC .............. *F24F 11/46* (2018.01); *G05B 17/02* (2013.01)

(58) Field of Classification Search
None
See application file for complete search history.

(56) References Cited

U.S. PATENT DOCUMENTS

| | | | |
|---|---|---|---|
| 2007/0028632 A1* | 2/2007 | Liu | ..................... F04D 15/0066 62/177 |
| 2017/0090438 A1* | 3/2017 | Liu | ..................... F04D 15/0066 |
| 2019/0376507 A1* | 12/2019 | Vala | ....................... F04B 49/065 |

FOREIGN PATENT DOCUMENTS

| | | |
|---|---|---|
| CN | 101509680 A | 8/2009 |
| CN | 102094801 A | 6/2011 |

(Continued)

OTHER PUBLICATIONS

Viholainen, Juha & Tamminen, Jussi & Ahonen, Tero & Ahola, Jero & Vakkilainen, Esa & Soukka, Risto. (2013). Energy-efficient control strategy for variable speed-driven parallel pumping systems. Energy Efficiency. 6. 10.1007/s12053-012-9188-0. (Year: 2013).*

(Continued)

*Primary Examiner* — Kenneth M Lo
*Assistant Examiner* — Istiaque Ahmed
(74) *Attorney, Agent, or Firm* — Morgan, Lewis & Bockius LLP (57) ABSTRACT

A control method and apparatus for water pumps in an air conditioning system. The control method includes: obtaining the number of water pumps currently running, the current speed ratios and the current running lift of the water pumps; calculating a control range of the speed ratios; determining whether the current speed ratios are in the control range of the speed ratios; switching the number of running water pumps so as to enable the speed ratios of the water pumps to fall within the control range of the speed (Continued)

ratios. The number of water pumps can be switched according to the running number of water pumps and the lift of the water pumps, allowing the water pumps to run in the high-efficiency interval under the full-load working condition to achieve variable-frequency energy-saving control of the water pumps and reduction of running power consumption of the air conditioning system.

9 Claims, 4 Drawing Sheets

(56) References Cited

FOREIGN PATENT DOCUMENTS

| CN | 103195698 A | 7/2013 |
|----|-------------|--------|
| CN | 108131281 A | 6/2018 |
| CN | 109059216 A | 12/2018 |
| CN | 110397580 A | 11/2019 |
| JP | 4329435 B2 | 9/2009 |
| JP | 2012154544 A | 8/2012 |

OTHER PUBLICATIONS

Extended European Search Report, EP20770930.4, Apr. 11, 2022, 11 pgs.

Guangdong Midea HVAC Equipment Co., Ltd., English translation of first OA for CN application 201910630396.0, Apr. 14, 2020, 14 pgs.

Guangdong Midea HVAC Equipment Co., Ltd., English translation of second OA for CN application 201910630396.0, Dec. 3, 2020, 3 pgs.

Guangdong Midea HVAC Equipment Co., Ltd., English translation of ISR for PCT application PCT/CN2020/078842, Jan. 6, 2020, 11 pgs.

Zhu, Energy-saving Research of Parallel-pumps Run with Variable Speed at High-efficient Range, College of Environmental Science and Engineering, vol. 33' Sum., No. 191, May 2015' No. 3, 4 pgs.

* cited by examiner

CONTROL METHOD AND APPARATUS FOR WATER PUMPS IN AIR CONDITIONING SYSTEM, AND AIR CONDITIONING SYSTEM

CROSS-REFERENCES TO RELATED APPLICATIONS

The present application is a continuation application of International (PCT) Patent Application No. PCT/CN2020/078842 filed on Mar. 11, 2020, which claims priority to the Chinese patent application No. 201910630396.0 filed on Jul. 12, 2019, the entire content of which are incorporated herein by reference.

TECHNICAL FIELD

The present disclosure relates to the field of air conditioning, and in particular to a control method and apparatus for a water pump in an air conditioning system, and an air conditioning system.

BACKGROUND

At present, the switching conditions of the number of running water pumps in a central air conditioning are generally controlled according to the speed. Specifically, when the speed is lower than the lower limit of the speed, one running pump is reduced, and when the speed reaches the upper limit of the speed, one running pump is added. Although this control method is simple and easy to implement, since the flow rate and lift of the water pumps are larger than actual, the air conditioning system will not start another pump based on the efficiency when the number of running water pumps is controlled based on the speed. As a result, the pump often runs in a low-efficiency range, increasing the energy consumption of the air conditioning system.

SUMMARY

The present disclosure aims to solve one of the technical problems in the related technology at least to a certain extent.

To this end, the first purpose of the present disclosure is to provide a control method for a water pump in an air conditioning system. According to the control method, the number of the running pump can be switched according to the number of the water pumps currently running and the lift of the water pumps, so that the water pumps run in the high-efficiency interval under the full-load working condition, and the purposes of variable-frequency energy-saving control of the water pumps and reduction of running power consumption of the air conditioning system are achieved.

The second purpose of the present disclosure is to provide a control apparatus for a water pump in an air conditioning system.

The third purpose of the present disclosure is to provide a computer-readable storage medium.

The fourth purpose of the present disclosure is to provide a computer device.

The fifth purpose of the present disclosure is to provide an air conditioning system.

In order to achieve the above purposes, some embodiments of the first aspect of the present application proposes a control method for a water pump in an air conditioning system, wherein the air conditioning system comprises a plurality of pumps in parallel, and the control method comprises the following steps: acquiring the number of water pumps currently running in the air conditioning system, and the current rotation speed ratio and the current running lift of the water pumps; calculating a control range of the rotation speed ratio according to the number and the current running lift; determining whether the current rotation speed ratio is in the control range of the rotation speed ratio; and switching the number of the water pumps so as to enable the rotation speed ratio of the water pumps to fall within the control range of the rotation speed ratio if the current rotation speed ratio is not in the control range of the rotation speed ratio; or controlling the water pumps currently running to continue synchronous frequency conversion and speed regulation if the current rotation speed ratio is in the control range of the rotation speed ratio.

According to the control method for a water pump in an air conditioning system of some embodiments of the present disclosure, the control range of the rotation speed ratio is calculated according to the number and the current running lift of the water pumps, and then number of the running water pumps is switched according to the control range of the rotation speed ratio and the current rotation speed ratio. Therefore, the number of the running water pumps can be switched according to the number of the water pumps currently running and the lift of the water pumps, so that the water pumps run in the high-efficiency interval under the full-load working condition, and the purposes of variable-frequency energy-saving control of the water pumps and reduction of running power consumption of the air conditioning system are achieved.

In addition, the control method for a water pump in an air conditioning system according to the above-mentioned embodiments of the present disclosure may also have the following additional technical features:

According to some embodiments of the present disclosure, the control method for a water pump in an air conditioning system further includes: acquiring sample parameters of the water pumps and characteristic parameters of at least three sets of the water pumps running under different working conditions and establishing a pump model according to the sample parameters and the characteristic parameters, wherein the sample parameters comprise flow rate, lift and efficiency of the water pumps under a rated speed, and the characteristic parameters comprise flow rate, lift and efficiency of the water pumps under different working conditions; acquiring flow rate-efficiency-rotation speed ratio curves of water pumps at different lifts using the water pump model; calculating the rotation speed ratio corresponding to a best switching point for switching between the multiple sets of different numbers of water pumps according to the flow rate-efficiency-rotation speed ratio curves; and acquiring a correspondence relationship between the lift and the rotation speed ratio according to the rotation speed ratio corresponding to the best switching point for switching between the multiple sets of different numbers of water pumps.

According to some embodiments of the present disclosure, the water pump model is represented by the following formulas:

$$\begin{cases} H' = A_1 \left(\dfrac{Q'}{m}\right)^2 + B_1 k \dfrac{Q'}{m} + C_1 k^2 \\ \eta = A_2 \left(\dfrac{Q'}{km}\right)^3 + B_2 \left(\dfrac{Q'}{km}\right)^2 + C_2 \dfrac{Q'}{km} \end{cases}$$

where, m is the number of water pumps currently running, H' is the lift of the m water pumps in parallel after frequency conversion, η is the efficiency of the m water pumps in parallel, $A_1$, $B_1$, $C_1$, $A_2$, $B_2$, $C_2$ are all characteristic coefficients of the water pumps, k is the rotation speed ratio, and Q' is the flow rate of the m water pumps in parallel after frequency conversion.

According to some embodiments of the present disclosure, the correspondence relationship between the lift and the rotation speed ratio is expressed by the following formula:

$$k = f\left(\varphi, \frac{m_0}{m}\right),$$

where $\varphi = H/H_{rated}$, is the lift ratio, in which H is the current running lift of the water pumps, and the $H_{rated}$ is the rated lift of the water pumps, $m_0$ is the number of water pumps running after switching, and m is the number of water pumps currently running.

According to some embodiments of the present disclosure, the calculation of the control range of the rotation speed ratio according to the number and the current running lift comprises: calculating the control range of the rotation speed ratio according to the number, the current running lift and the correspondence relationship between the lift and the rotation speed ratio, where the control range of the rotation speed ratio is $$\left[f_1\left(\varphi, \frac{m-1}{m}\right), f_2\left(\varphi, \frac{m+1}{m}\right)\right] \cap [0.6, 1].$$

According to some embodiments of the present disclosure, the current running lift is obtained by the pressure difference between the inlet and outlet of the plurality of water pumps in parallel.

In order to achieve the above purposes, some embodiments of the second aspect of the present disclosure propose a control apparatus for a water pump in an air conditioning system, wherein the air conditioning system comprises a plurality of water pumps in parallel, and the control apparatus comprises: an acquisition module, configured to acquire the number of water pumps currently running in the air conditioning system and the current rotation speed ratio and the current running lift of the water pumps; a calculation module, configured to calculate a control range of the rotation speed ratio according to the number and the current running lift; a determination module, configured to determine whether the current rotation speed ratio is in the control range of the rotation speed ratio; and a control module, configured to switch the number of the water pumps so as to enable the rotation speed ratio of the water pumps to fall within the control range of the rotation speed ratio if the current rotation speed ratio is not in the control range of the rotation speed ratio, and to control the water pumps currently running to continue synchronous frequency conversion and speed regulation if the current rotation speed ratio is in the control range of the rotation speed ratio.

According to the control apparatus for a water pump in an air conditioning system of some embodiments of the present disclosure, the control range of the rotation speed ratio is calculated according to the number and the current running lift of the water pumps, and then number of the running water pumps is switched according to the control range of the rotation speed ratio and the current rotation speed ratio. Therefore, the number of the running water pumps can be switched according to the number of the water pumps currently running and the lift of the water pumps, so that the water pumps run in the high-efficiency interval under the full-load working condition, and the purposes of variable-frequency energy-saving control of the water pumps and reduction of running power consumption of the air conditioning system are achieved.

In order to achieve the above purposes, some embodiments of the third aspect of the present disclosure propose a computer-readable storage medium with a computer program stored thereon, wherein the program when executed by a processor, implements the control method for a water pump in an air conditioning system according to some embodiments of the first aspect of the present disclosure.

According to the computer-readable storage medium of some embodiments of the present disclosure, when the computer program is executed by the processor, the number of the running water pumps can be switched according to the number of the water pumps currently running and the lift of the water pumps, so that the water pumps run in the high-efficiency interval under the full-load working condition, and the purposes of variable-frequency energy-saving control of the water pumps and reduction of running power consumption of the air conditioning system are achieved.

In order to achieve the above purposes, some embodiments of the fourth aspect of the present disclosure proposes a computer device, comprising a memory, a processor, and a computer program stored on the memory, wherein the computer program when executed by the processor, implements the control method for a water pump in an air conditioning system according to some embodiments of the first aspect of the present disclosure.

According to the computer device of some embodiments of the present disclosure, when the computer program is executed by the processor, the number of the running water pumps can be switched according to the number of the water pumps currently running and the lift of the water pumps, so that the water pumps run in the high-efficiency interval under the full-load working condition, and the purposes of variable-frequency energy-saving control of the water pumps and reduction of running power consumption of the air conditioning system are achieved.

In order to achieve the above purposes, some embodiments of the fifth aspect of the present disclosure proposes an air conditioning system, comprises the control apparatus for a water pump in an air conditioning system proposed in some embodiments of the second aspect of the present disclosure, or the computer the computer proposed in the fourth aspect of the present disclosure.

According to the air conditioning system of some embodiments of the present disclosure, through the control apparatus for a water pump or computer device, the number of the running water pumps can be switched according to the number of the water pumps currently running and the lift of the water pumps, so that the water pumps run in the high-efficiency interval under the full-load working condition, and the purposes of variable-frequency energy-saving control of the water pumps and reduction of running power consumption of the air conditioning system are achieved.

The additional aspects and advantages of the present disclosure will be partly given in the following description, or will become obvious from the following description, or be understood through the practice of the present disclosure.

BRIEF DESCRIPTION OF THE DRAWINGS

The above and/or additional aspects and advantages of the present disclosure will become obvious and easy to understand from the description of the embodiments in conjunction with the following drawings, in which.

DETAILED DESCRIPTION

The embodiments of the present disclosure are described in detail below. Examples of the embodiments are shown in the accompanying drawings, in which the same or similar reference numerals indicate the same or similar elements or elements with the same or similar functions. The embodiments described below with reference to the accompanying drawings are exemplary, and are intended to explain the present disclosure, but should not be construed as limiting the present disclosure.

The following describes the control method and apparatus for a water pump in an air conditioning system, and the air conditioning system according to the embodiments of the present disclosure with reference to the accompanying drawings.

Figure 1:
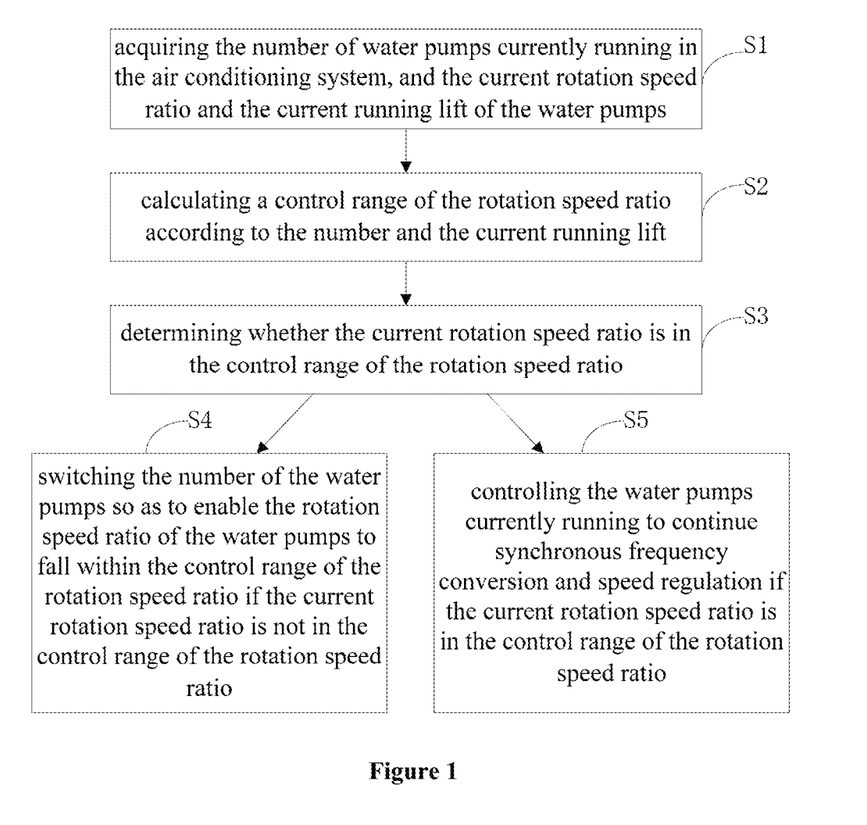
FIG. 1 is a flowchart of a control method for a water pump in an air conditioning system according to some embodiments of the present disclosure.

FIG. 1 is a flowchart of a control method for a water pump in an air conditioning system according to some embodiments of the present disclosure.

The air conditioning system of some embodiments includes a plurality of water pumps in parallel. Generally speaking, the plurality of water pumps in parallel should be of the same type and function.

As shown in FIG. 1, the control method of water pumps in the air conditioning system includes the following S1-S5 steps:

S1: acquiring the number of water pumps currently running in the air conditioning system, and the current rotation speed ratio and the current running lift of the water pumps.

In some embodiments, the current running lift is obtained by the pressure difference between the inlet and outlet of the plurality of water pumps in parallel.

Specifically, the pressure difference between the inlet and outlet of the plurality of water pumps in parallel is the current running lift. It is understandable that theoretically, the lift of the plurality of water pumps in parallel is equal to the lift of one pump, but in fact, after the parallel connection, the water system characteristics (piping characteristics) will change, and the inlet and outlet pressures of a plurality of water pumps in parallel will change, and the lift will also change.

Specifically, during the operation of the air conditioning system, the number of water pumps currently running, the current rotation speed ratio, and the current running lift may be obtained in real time, in which the current rotation speed ratio of the water pumps refers to the ratio of the speed of the water pumps after the frequency conversion to the rated speed.

S2: calculating a control range of the rotation speed ratio according to the number and the current running lift.

Specifically, the control range of the rotation speed ratio under optimal running efficiency of water pumps (high efficiency interval) may be calculated according to the number of the water pumps currently running and the current running lift. This control range of the rotation speed ratio is the optimum control range of the rotation speed ratio under the water pumps currently running and the current running lift.

S3: determining whether the current rotation speed ratio is in the control range of the rotation speed ratio.

Specifically, during the variable frequency operation of the water pumps, the current rotation speed ratio of the water pumps may be monitored in real time to determine whether the current rotation speed ratio is still within the control range of the rotation speed ratio.

S4: switching the number of the water pumps so as to enable the rotation speed ratio of the water pumps to fall within the control range of the rotation speed ratio if the current rotation speed ratio is not in the control range of the rotation speed ratio.

Specifically, if the current rotation speed ratio is not within the control range of the rotation speed ratio, for example, the current rotation speed ratio is greater than the upper limit of the control range of the rotation speed ratio, or the current rotation speed ratio is less than the lower limit of the control range of the rotation speed ratio, that is, the current rotation speed ratio is not the most efficient rotation speed ratio under the current working conditions, then the number of the running water pumps is switched so as to enable the rotation speed ratio of the water pumps to fall within the control range of the rotation speed ratio.

Specifically, the control range of the rotation speed ratio after switching can be calculated according to the number of water pumps running after switching and the current running lift. If the current rotation speed ratio falls within the control range of the rotation speed ratio after switching, the number of running water pumps is switched to number corresponding to the control range of the rotation speed ratio after switching, so as to enable the current rotation speed ratio to fall within the control range of the rotation speed ratio corresponding to the optimal efficiency, and the current pump to run in the high efficiency range.

S5: controlling the water pumps currently running to continue synchronous frequency conversion and speed regulation if the current rotation speed ratio is in the control range of the rotation speed ratio.

It can be understood that if the current rotation speed ratio is within the control range of the rotation speed ratio, the pump is running in the control range of the rotation speed ratio with the optimal efficiency, and there is no need to switch the number of running water pumps.

According to the control method for a water pump in an air conditioning system, the control range of the rotation speed ratio at the optimal efficiency is calculated according to the number and the current running lift of the water pumps, and then number of the running water pumps is switched according to the control range of the rotation speed ratio and the current rotation speed ratio. Therefore, the number of the running water pumps can be switched according to the running efficiency of the water pumps and the lift of the water pumps, so that the water pumps run in the high-efficiency interval under the full-load working condition, and the purposes of variable-frequency energy-saving control of the water pumps and reduction of running power consumption of the air conditioning system are achieved.

In some embodiments of the present disclosure, the control method for a water pump in an air conditioning system may further include: acquiring sample parameters of the water pumps and characteristic parameters of at least three sets of the water pumps running under different working conditions and establishing a pump model according to the sample parameters and the characteristic parameters, wherein the sample parameters comprise flow rate, lift and efficiency of the water pumps under a rated speed, and the characteristic parameters comprise flow rate, lift and efficiency of the water pumps under different working conditions; acquiring flow rate-efficiency-rotation speed ratio curves of water pumps at different lifts using the water pump model; calculating the rotation speed ratio corresponding to a best switching point for switching between the multiple sets of different numbers of water pumps according to the flow rate-efficiency-rotation speed ratio curves; and acquiring a correspondence relationship between the lift and the rotation speed ratio according to the rotation speed ratio corresponding to the best switching point for switching between the multiple sets of different numbers of running water pumps.

In an example, the water pump model is represented by the following formulas:

$$\begin{cases} H' = A_1\left(\dfrac{Q'}{m}\right)^2 + B_1 k \dfrac{Q'}{m} + C_1 k^2 \\ \eta = A_2\left(\dfrac{Q'}{km}\right)^3 + B_2\left(\dfrac{Q'}{km}\right)^2 + C_2 \dfrac{Q'}{km}, \end{cases}$$

where, m is the number of water pumps currently running, H' is the lift of the m water pumps in parallel after frequency conversion, $\eta$ is the efficiency of the m water pumps in parallel, $A_1$, $B_1$, $C_1$, $A_2$, $B_2$, $C_2$ are all characteristic coefficients of the water pumps, k is the rotation speed ratio, and Q' is the flow rate of the m water pumps in parallel after frequency conversion.

Specifically, the formulas for the lift H and efficiency $\eta$ of one water pump at a rated speed are:

$$H = A_1 Q^2 + B_1 Q + C_1 \tag{1}$$

$$\eta = A_2 Q^3 + B_2 Q^2 + C_2 Q \tag{2}$$

where, Q is the flow rate when one pump is running.

The formula for flow rate of m water pumps in parallel is $$Q_m = mQ \tag{3}$$

where, $Q_m$ is the flow of m water pumps in parallel at a rated speed.

Variable frequency water pumps can have the following inherent characteristics:

$$\dfrac{Q'}{Q_m} = \dfrac{n'}{n} = k \tag{4}$$

$$\dfrac{H'}{H_m} = \left(\dfrac{n'}{n}\right)^2 = k^2 \tag{5}$$

where, n' is the speed of m pumps after frequency conversion, n is the rated speed of m pumps, $H_m$ is the lift of m water pumps in parallel at the rated speed, and k is the rotation speed ratio.

Substituting the above formula (3) into formula (1), the lift $H_m$ of m water pumps in parallel at rated speed is:

$$H_m = A_1\left(\dfrac{Q_m}{m}\right)^2 + B_1 \dfrac{Q_m}{m} + C_1 \tag{6}$$

Replacing $H_m$ and $Q_m$ in formula (6) according to formula (4) and formula (5), the lift H' of m water pumps in parallel after frequency conversion is:

$$H' = A_1\left(\dfrac{Q'}{m}\right)^2 + B_1 k \dfrac{Q'}{m} + C_1 k^2 \tag{7}$$

Substituting the above formula (3) into the formula (1), the efficiency of m water pumps in parallel is:

$$\eta = A_2\left(\dfrac{Q_m}{m}\right)^3 + B_2\left(\dfrac{Q_m}{m}\right)^2 + C_2 \dfrac{Q_m}{m} \tag{8}$$

Replacing $Q_m$ in formula (8) according to the formula (4), the efficiency of m water pumps in parallel is:

$$\eta = A_2\left(\dfrac{Q'}{km}\right)^3 + B_2\left(\dfrac{Q'}{km}\right)^2 + C_2 \dfrac{Q'}{km} \tag{9}$$

Therefore, the water pump model can be represented by formulas (7) and (9) as follows:

$$\begin{cases} H' = A_1\left(\dfrac{Q'}{m}\right)^2 + B_1 k \dfrac{Q'}{m} + C_1 k^2 \\ \eta = A_2\left(\dfrac{Q'}{km}\right)^3 + B_2\left(\dfrac{Q'}{km}\right)^2 + C_2 \dfrac{Q'}{km} \end{cases}$$

After the water pump model is established, multiple sets of flow rate-efficiency-rotation speed ratio curves of the water pumps at different lifts are obtained according to the water pump model, and each set of curves should include the flow rate-efficiency-rotation speed ratio curves for all possible number of running water pumps. For example, when 3 pumps are connected in parallel, multiple sets of flow rate-efficiency-rotation speed ratio curves of the water pumps at different lifts may be obtained, and at each lift, flow rate-efficiency-rotation speed ratio curves for 1 pump, 2 pumps, and 3 pumps are obtained. The intersection point (same flow rate) of the flow rate-efficiency curve of each set of curves (same lift) is the best switching point when switching between different numbers of water pumps, and the rotation speed ratio corresponding to this intersection point is the rotation speed ratio corresponding to a best switching point. Therefore, the rotation speed ratio corresponding to the optimal switching point when switching between different numbers of water pumps can be calculated. Finally, the correspondence relationship between the lift H and the rotation speed ratio k is obtained according to the rotation speed ratio corresponding to the best switching point when switching between multiple sets of different numbers of water pumps.

Therefore, a pump model is first established based on the sample parameters and characteristic parameters of the water pumps, then the flow rate-efficiency-rotation speed ratio curves of the water pumps under different lifts are obtained according to the water pump model, then the rotation speed ratio corresponding to the optimal switching point of the number of running water pumps is obtained according to the curve, and finally, the correspondence relationship between the lift and the rotation speed ratio is obtained according to the rotation speed ratio. Therefore, it is possible to switch the number of the running water pumps according to the pump efficiency and the lift, so that the water pumps run in the high-efficiency interval under the full-load working condition.

In an example of the present disclosure, the correspondence relationship between the lift and the rotation speed ratio can be represented by the following formula:

$$k = f\left(\varphi, \frac{m_0}{m}\right),$$

where $\varphi = H/H_{rated}$, is the lift ratio, in which H is the current running lift of the water pumps, and the $H_{rated}$ is the rated lift of the water pumps, $m_0$ is the number of water pumps running after switching, and m is the number of water pumps currently running.

In this example, the calculation of the control range of the rotation speed ratio according to the number and the current running lift comprises: calculating the control range of the rotation speed ratio according to the number, the current running lift and the correspondence relationship between the lift and the rotation speed ratio, where the control range of the rotation speed ratio is $$\left[f_1\left(\varphi, \frac{m-1}{m}\right), f_2\left(\varphi, \frac{m+1}{m}\right)\right] \cap [0.6, 1].$$

Specifically, according to the correspondence relationship between the current lift and the rotation speed ratio and the number m of running water pumps, the lower limit of the control range of the rotation speed ratio can be obtained as $$f_1\left(\varphi, \frac{m-1}{m}\right),$$

and upper limit of the control range of the rotation speed ratio can be obtained as $$f_2\left(\varphi, \frac{m+1}{m}\right).$$

Switching the number of water pumps may be to reduce 1 running pump or increase 1 running pump. It can be understood that when the pump efficiency is too low (less than 0.6), the reliability of the pump running will be affected, and it will not be sufficient to support the long-term running of the pump. Therefore, the lower limit of the control range of rotation speed ratio can be greater than 0.6 to ensure the reliability of the pump running.

As mentioned above, after calculating the control range of the rotation speed ratio corresponding to the high efficiency interval under different working conditions (different lifts, different number of water pumps), the rotation speed ratio k and the current running lift H can be monitored in real time to determine whether the current rotation speed ratio is in the control range of the rotation speed ratio, and switching the number of the water pumps so as to enable the rotation speed ratio of the water pumps to fall within the control range of the rotation speed ratio if the current rotation speed ratio is not in the control range of the rotation speed ratio. As a result, the number of running water pumps can be switched according to the optimal efficiency, ensuring that the water pumps running in a high efficiency range.

The following describes the control method for a water pump in an air conditioning system of a specific example.

In this specific example, the air conditioning system includes 3 water pumps in parallel. According to the water pump model $$\begin{cases} H' = A_1\left(\frac{Q'}{m}\right)^2 + B_1 k \frac{Q'}{m} + C_1 k^2 \\ \eta = A_2\left(\frac{Q'}{km}\right)^3 + B_2\left(\frac{Q'}{km}\right)^2 + C_2 \frac{Q'}{km} \end{cases},$$

the flow rate-efficiency-rotation speed ratio curves at the lift of 30%, 40%, 50%, 60%, 70%, 80%, 90% and 100% can be calculated respectively. The intersection point of the efficiency curve of one pump and the efficiency curve of two pumps is the best switching point A between one pump and two pumps, and the intersection point of the efficiency curve of two pumps and the efficiency curve of three pumps is the best switching point B between 2 pumps and 3 pumps.

Figure 2:
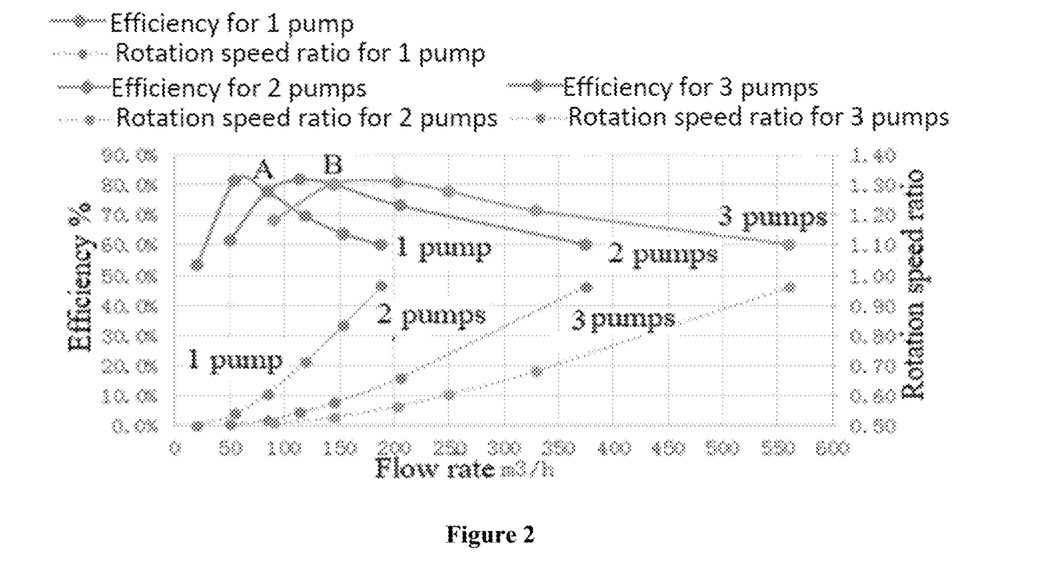
FIG. 2 is a flow rate-efficiency-rotation speed ratio curve diagram at the lift ratio of 30% according to a specific example of the present disclosure.
Figure 3:
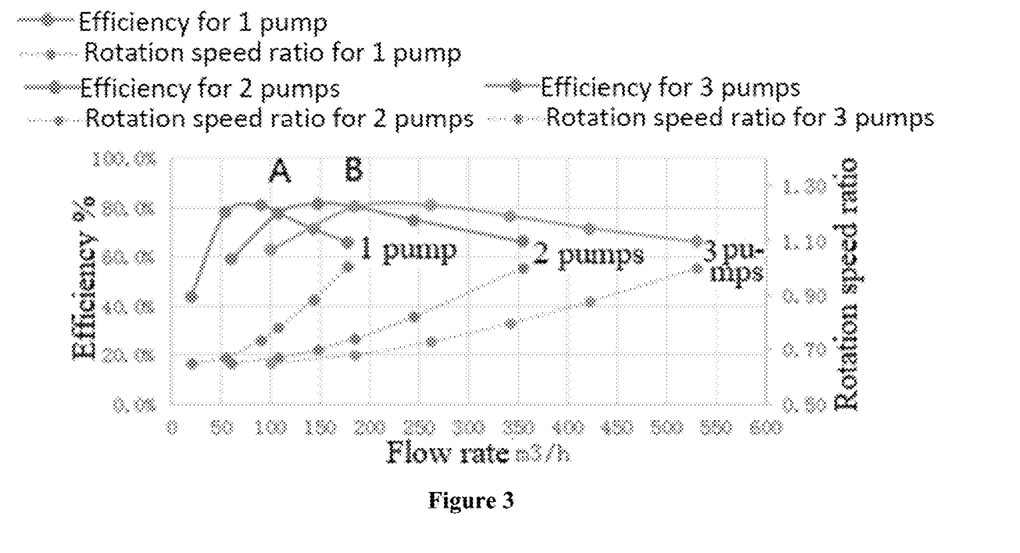
FIG. 3 is a flow rate-efficiency-rotation speed ratio curve diagram at the lift ratio of 50% according to a specific example of the present disclosure.
Figure 4:
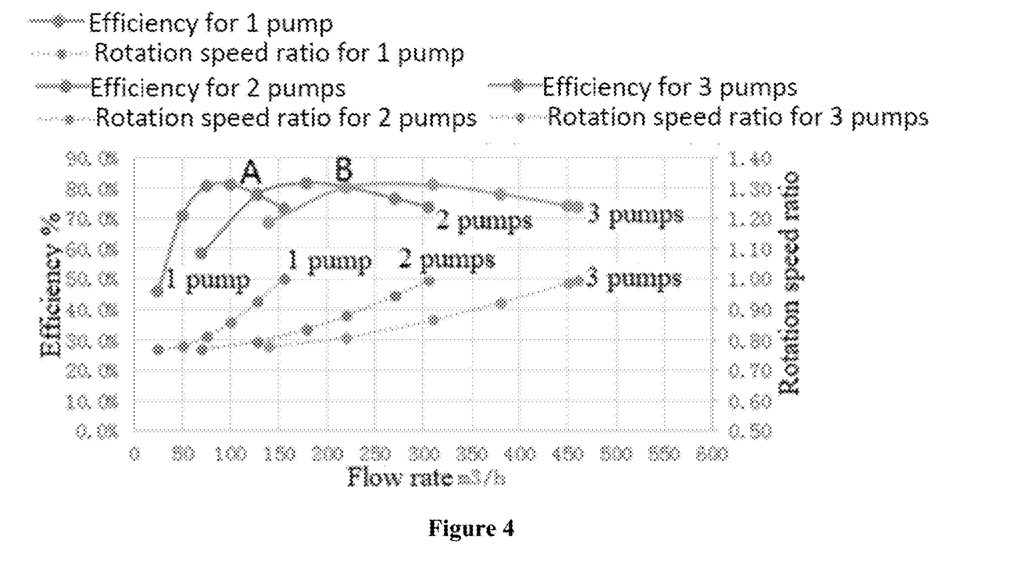
FIG. 4 is a flow rate-efficiency-rotation speed ratio curve diagram at the lift ratio of 70% according to a specific example of the present disclosure.

As shown in FIG. 2 to FIG. 4, when the lift is 30%, 50%, and 70%, and the number of running water pumps is 1, 2, and 3, for the flow rate-efficiency-rotation speed ratio curve, the intersection point of the efficiency curve of one pump and the efficiency curve of two pumps is the best switching point A between one pump and two pumps, and the intersection point of the efficiency curve of two pumps and the efficiency curve of three pumps is the best switching point B between two pumps and three pumps. Similarly, the best switching points A and B can be obtained when the lift is 40%, 60%, 80%, 90%, and 100%, and the number of running water pumps is 1, 2, and 3. Then, 7 sets of rotation speed ratios $K_{1A}$, $K_{2A}$, $K_{2B}$, $K_{3B}$ for different pump numbers can be obtained according to the best switching points A and B respectively, in which $K_{1A}$ is the rotation speed ratio of 1 pump at the best switching point A, $K_{2A}$ is the rotation speed ratio of 2 pumps at the best switching point A, $K_{2B}$ is the rotation speed ratio of 2 pumps at the best switching point B, and $K_{3B}$ is 3 pumps The rotation speed ratio at the optimal switching point B.

From the flow rate-efficiency-rotation speed ratio curve at the lift of 30%, 40%, 50%, 60%, 70%, 80%, 90%, and 100%, the correspondence relationship between the current running lift ratio $\varphi$ and the rotation speed ratio k is $$k = \varphi^{0.5}\left(\frac{m_0}{m}\right)^{0.15},$$

and according to the control range of the rotation speed ratio $$\left[f_1\left(\varphi, \frac{m-1}{m}\right), f_2\left(\varphi, \frac{m+1}{m}\right)\right] \cap [0.6, 1],$$

it can be obtained $$f_1\left(\varphi, \frac{m-1}{m}\right) = \varphi^{0.5}\left(\frac{m-1}{m}\right)^{0.15}$$

and $$f_2\left(\varphi, \frac{m+1}{m}\right) = \varphi^{0.5}\left(\frac{m+1}{m}\right)^{0.15},$$

in which the number m of water pumps currently running and the current running lift $\varphi$ (according to $\varphi = H/H_{rated}$) are known. Then, $f_1$ and $f_2$ can be calculated, and then 7 sets of rotation speed ratios $K_{1A}$, $K_{2A}$, $K_{2B}$, $K_{3B}$ for different pump numbers can be calculated. For example, when $$\varphi = 30,$$

$$k_{1A} = 30^{0.5} * \left(\frac{1+1}{1}\right)^{0.15} = 0.61,$$

$$k_{2A} = 30^{0.5} * \left(\frac{2-1}{2}\right)^{0.15} = 0.52,$$

$$k_{2B} = 30^{0.5} * \left(\frac{2+1}{2}\right)^{0.15} = 0.58,$$

$$k_{3A} = 30^{0.5} * \left(\frac{3-1}{3}\right)^{0.15} = 0.53.$$

Similarly, $K_{1A}$, $K_{2A}$, $K_{2B}$, $K_{3B}$ can be calculated at lift of 40%, 50%, 60%, 70%, 80%, 90% and 100%. Therefore, at different lifts, the control range of the rotation speed ratio for 1 pump at the optimal efficiency is $[0.6, K_{1A}]$ the control range of the rotation speed ratio for 2 pumps at the optimal efficiency is $[K_{2A}, K_{2B}]$, and the control range of the rotation speed ratio for 3 pumps at the optimal efficiency is $[K_{3B}, 1]$, and then the following table 1 is obtained.

| Lift ratio $\varphi$ | $K_0$ | Control range of the rotation speed ratio for 1 pump $K_{1A}$ | Control range of the rotation speed ratio for 2 pumps $K_{2A}$ | $K_{2B}$ | Control range of the rotation speed ratio for 3 pumps $K_{3B}$ | $K_3$ |
|---|---|---|---|---|---|---|
| 30% | 0 | 0.61 | 0.52 | 0.58 | 0.53 | 1.0 |
| 40% | 0 | 0.70 | 0.6 | 0.67 | 0.61 | 1.0 |
| 50% | 0 | 0.78 | 0.67 | 0.74 | 0.68 | 1.0 |
| 60% | 0 | 0.86 | 0.74 | 0.82 | 0.75 | 1.0 |
| 70% | 0 | 0.93 | 0.79 | 0.88 | 0.81 | 1.0 |
| 80% | 0 | 0.99 | 0.85 | 0.94 | 0.86 | 1.0 |
| 100% | 0 | 1.11 | 0.95 | 1.04 | 0.96 | 1.0 |

It can be seen from Table 1 that when the lift is 30%, the control range of the rotation speed ratio for 1 pump at the optimal efficiency is [0.6, 0.61], the control range of the rotation speed ratio for 2 pumps at the optimal efficiency is [0.52, 0.58], and the control range of the rotation speed ratio for 3 pumps at the optimal efficiency is [0.53, 1].

For example, when only one pump is running currently and the lift ratio is 30%, if the rotation speed ratio k is found to be 0.57 during running, that is, is not within the range [0.6, 0.61], and the current operating lift is still 30% and not changed, then the number of the currently running water pumps should be increased to 2, so that the rotation speed ratio of the pump falls within the control range of rotation speed ratio [0.52, 0.58] for the two pumps to ensure that the water pumps run in the high efficiency range.

Of course, if the current rotation speed ratio does not fall within the control range of rotation speed ratio and the lift changes, the lift ratio can be considered when switching the number of water pumps.

In summary, in the control method for a water pump in an air conditioning system of some embodiments of the present disclosure, flow rate-efficiency-rotation speed ratio curves of water pumps at different lifts are obtained according to the water pump model, then multiple sets of control ranges of rotation speed ratio for different numbers of water pumps at optimal efficiency are calculated, and then the number of water pumps is switched according to the control range of the rotation speed ratio, the current rotation speed ratio, the current running lift and the number of running water pumps. Compared with the switching of the number of running water pumps based only on the speed, the method of the present disclosure can switch the number of running water pumps according to the efficiency and lift of the pump, so that the water pumps run in the high-efficiency interval under the full-load working condition, and the purposes of variable-frequency energy-saving control of the water pumps and reduction of running power consumption of the air conditioning system are achieved.

Figure 5:
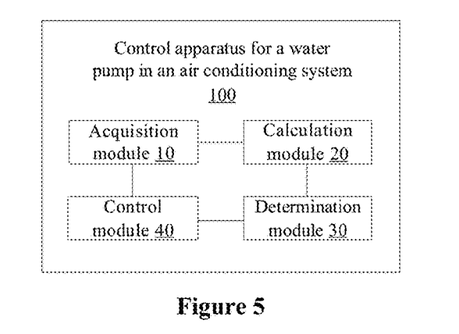
FIG. 5 is a structural block diagram of a control apparatus for a water pump in an air conditioning system according to some embodiments of the present disclosure.

FIG. 5 is a structural block diagram of a control apparatus for a water pump in an air conditioning system according to some embodiments of the present disclosure.

In some embodiments, the air conditioning system 1000 includes a plurality of water pumps in parallel.

As shown in FIG. 5, the control apparatus for a water pump in an air conditioning system 100 includes: an acquisition module 10, a calculation module 20, a determination module 30 and a control module 40.

Among them, the acquisition module 10 is configured to acquire the number of water pumps currently running in the air conditioning system and the current rotation speed ratio and the current running lift of the water pumps, the calculation module 20 is configured to calculate a control range of the rotation speed ratio according to the number and the current running lift, the determination module is configured to determine whether the current rotation speed ratio is in the control range of the rotation speed ratio, and the control module 40 is configured to switch the number of the water pumps so as to enable the rotation speed ratio of the water pumps to fall within the control range of the rotation speed ratio if the current rotation speed ratio is not in the control range of the rotation speed ratio, and to control the water pumps currently running to continue synchronous frequency conversion and speed regulation if the current rotation speed ratio is in the control range of the rotation speed ratio.

Specifically, during the operation of the air-conditioning system 1000, the acquisition module 10 can acquire the number of water pumps currently running, the current rotation speed ratio and the current running lift in real time, and send them to the calculation module 20. The calculation module 20 calculates the control range of the rotation speed ratio at the optimal efficiency according to the number and the current running lift and sends it to the determination module 30. The determination module 30 determines whether the current rotation speed ratio is in the control range of the rotation speed ratio at the optimal efficiency under the current working conditions, and sends the result to the control module 40. The control module 40 switches the number of running water pumps according to the result, so as to enable the rotation speed ratio of the water pumps to fall within the control range of the rotation speed ratio.

Figure 6:
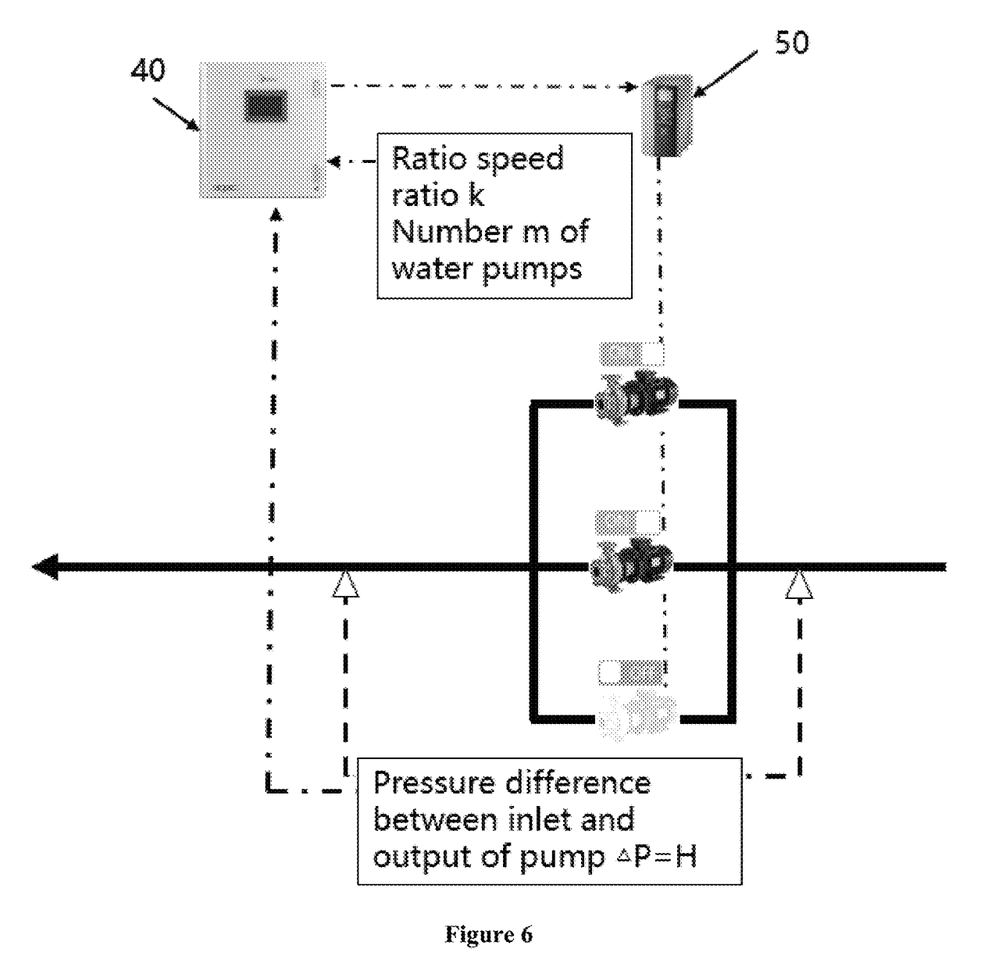
FIG. 6 is a schematic structural diagram of a control apparatus for a water pump in an air conditioning system according to an example of the present disclosure.

Preferably, as shown in FIG. 6, the control apparatus for a water pump in an air conditioning system 100 includes a pump power cabinet 50 to drive a plurality of water pumps in parallel to operate.

It should be noted that, the detailed explanation of the control apparatus for a water pump in an air conditioning system is similar to the detailed explanation of the control method for a water pump in an air conditioning system, and will not be repeated here.

According to the control apparatus for a water pump in an air conditioning system, the control range of the rotation speed ratio at the optimal efficiency is calculated according to the number and the current running lift of the water pumps, and then number of the running water pumps is switched according to the control range of the rotation speed ratio and the current rotation speed ratio. Therefore, the number of the running water pumps can be switched according to the running efficiency of the water pumps and the lift of the water pumps, so that the water pumps run in the high-efficiency interval under the full-load working condition, and the purposes of variable-frequency energy-saving control of the water pumps and reduction of running power consumption of the air conditioning system are achieved.

Further, the present disclosure proposes a computer-readable storage medium with a computer program stored thereon, wherein the program when executed by a processor, implements the control method for a water pump in an air conditioning system according to some above embodiments of the present disclosure.

When the computer program stored on the computer readable storage medium of some embodiments of the present disclosure is executed, the number of the running water pumps can be switched according to the running efficiency of the water pumps and the lift of the water pumps, so that the water pumps run in the high-efficiency interval under the full-load working condition, and the purposes of variable-frequency energy-saving control of the water pumps and reduction of running power consumption of the air conditioning system are achieved.

Figure 7:
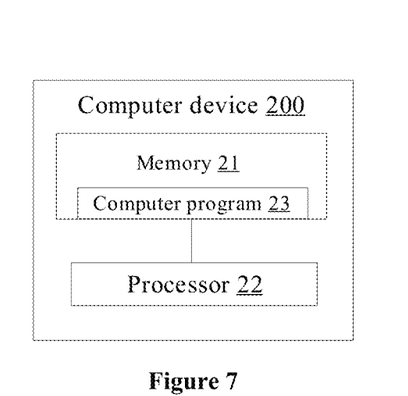
FIG. 7 is a structural block diagram of a computer device according to some embodiments of the present disclosure.

FIG. 7 is a structural block diagram of a computer device according to some embodiments of the present disclosure.

As shown in FIG. 7, the computer device 200 includes a memory 21, a processor 22, and a computer program 23 stored on the memory 21, wherein the computer program 23 when executed by the processor 22, implements the control method for a water pump in an air conditioning system according to some above embodiments of the present disclosure.

When the computer program stored on the computer device of some embodiments of the present disclosure is executed by the processor, the number of the running water pumps can be switched according to the running efficiency of the water pumps and the lift of the water pumps, so that the water pumps run in the high-efficiency interval under the full-load working condition, and the purposes of variable-frequency energy-saving control of the water pumps and reduction of running power consumption of the air conditioning system are achieved.

Figure 8:
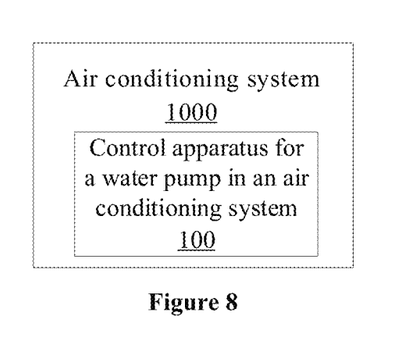
FIG. 8 is a structural block diagram of an air conditioning system according to some embodiments of the present disclosure.

FIG. 8 is a structural block diagram of an air conditioning system according to some embodiments of the present disclosure.

As shown in FIG. 8, the air conditioning system 1000 includes the control apparatus for a water pump in an air conditioning system 100 or the computer device 200 according to some above embodiments of the present disclosure.

For the air conditioning system of some embodiments of the present disclosure, with the control apparatus for a water pump in an air conditioning system or the computer device, the number of the running water pumps can be switched according to the running efficiency of the water pumps and the lift of the water pumps, so that the water pumps run in the high-efficiency interval under the full-load working condition, and the purposes of variable-frequency energy-saving control of the water pumps and reduction of running power consumption of the air conditioning system are achieved.

In the description of this specification, descriptions with reference to the terms such as "one embodiment", "some embodiments", "examples", "specific examples", or "some examples" means that the specific feature, structure, material, or characteristic described in combination with some embodiments or examples is included in at least one embodiment or example of the present application. In this specification, the schematic representations of the above-mentioned terms do not necessarily refer to the same embodiment or example. Moreover, the described specific features, structures, materials or characteristics can be combined in any one or more embodiments or examples in a suitable manner.

In the description of the present disclosure, it should be understood that, the directions or positional relationships indicated by the terms "center", "longitudinal", "transverse", "length", "width", "thickness", "upper", "lower", "front", "back", "left", "right", "vertical", "radial", "circumferential", etc. are based on the directions or positional relationships shown in the drawings, and are only for the convenience of describing the application and simplifying the description, and does not indicate or imply that the device or element referred to must have a specific orientation, be constructed and operated in a specific orientation, and therefore cannot be understood as a limitation of the application.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, the term "a plurality of" means at least two, such as two, three, etc., unless specifically defined otherwise.

In the present disclosure, unless otherwise clearly specified and limited, the terms "installed", "connected", "linked", "fixed" and other terms should be understood in a broad sense, for example, it can be a fixed connection or a detachable connection , or integrated; it can be a mechanical connection or an electrical connection; it can be directly connected or indirectly connected through an intermediate medium, it can be the internal communication of two components or the interaction relationship between two components, unless otherwise clearly specified and limited. For those of ordinary skill in the art, the specific meanings of the above-mentioned terms in the present disclosure can be understood according to specific circumstances.

Although the embodiments of the present disclosure have been shown and described above, it can be understood that the above-mentioned embodiments are exemplary and should not be construed as limiting the present disclosure.

Those of ordinary skill in the art can make changes, modifications, replacements and variants to the above-mentioned embodiments within the scope of the present application.

What is claimed is:

1. A control method for a water pump in an air conditioning system, wherein the air conditioning system comprises a plurality of water pumps in parallel, and the control method comprises:
   acquiring a number of the plurality of water pumps currently running in the air conditioning system, and a current rotation speed ratio and a current running lift of the water pumps;
   calculating a control range of a rotation speed ratio according to the number and the current running lift;
   determining whether the current rotation speed ratio is in the control range of the rotation speed ratio,
   switching the number of the plurality of water pumps to enable the rotation speed ratio of the water pumps to fall within the control range of the rotation speed ratio if the current rotation speed ratio is not in the control range of the rotation speed ratio; and
   controlling the water pumps currently running to continue synchronous frequency conversion and speed regulation if the current rotation speed ratio is in the control range of the rotation speed ratio.

2. The control method for the water pump in the air conditioning system according to claim 1, further comprising:
   acquiring sample parameters of the water pumps and characteristic parameters of at least three sets of the water pumps running under different working conditions, and establishing a pump model according to the sample parameters and the characteristic parameters, wherein the sample parameters comprise flow rate, lift and efficiency of the water pumps under a rated speed, and the characteristic parameters comprise flow rate, lift and efficiency of the water pumps under different working conditions;
   acquiring flow rate-efficiency-rotation speed ratio curves of the water pumps at different lifts using the water pump model;
   calculating the rotation speed ratio corresponding to a best switching point for switching between the multiple sets of different numbers of the water pumps according to the flow rate-efficiency-rotation speed ratio curves; and
   acquiring a correspondence relationship between the lift and the rotation speed ratio according to the rotation speed ratio corresponding to the best switching point for switching between the multiple sets of different numbers of water pumps.

3. The control method for the water pump in the air conditioning system according to claim 2, wherein the water pump model is expressed as:

$$\begin{cases} H' = A_1 \left(\frac{Q'}{m}\right)^2 + B_1 k \frac{Q'}{m} + C_1 k^2 \\ \eta = A_2 \left(\frac{Q'}{km}\right)^3 + B_2 \left(\frac{Q'}{km}\right)^2 + C_2 \frac{Q'}{km} \end{cases}$$

where m is the number of water pumps currently running, H' is the lift of the m water pumps in parallel after frequency conversion, η is the efficiency of the m water pumps in parallel, $A_1$, $B_1$, $C_1$, $A_2$, $B_2$, $C_2$ are all characteristic coefficients of the water pumps, k is the rotation speed ratio, and Q' is the flow rate of the m water pumps in parallel after frequency conversion.

4. The control method for the water pump in the air conditioning system according to claim 2, wherein the correspondence relationship between the lift and the rotation speed ratio is expressed by the following formula:

$$k = f\left(\varphi, \frac{m_0}{m}\right),$$

where $\varphi = H/H_{rated}$, is the lift ratio, in which H is the current running lift of the water pumps, and the $H_{rated}$ is the rated lift of the water pumps, $m_0$ is the number of water pumps running after the switching control, and m is the number of water pumps currently running.

5. The control method for the water pump the air conditioning system according to claim 4, wherein calculating a control range of the rotation speed ratio according to the number and the current running lift comprises:
   calculating the control range of the rotation speed ratio according to the number, the current running lift and the correspondence relationship between the lift and the rotation speed ratio, where the control range of the rotation speed ratio is $$\left[f_1\left(\varphi, \frac{m-1}{m}\right), f_2\left(\varphi, \frac{m+1}{m}\right)\right] \cap [0.6, 1].$$

6. The control method for the water pump in the air conditioning system according to claim 1, wherein the current running lift is obtained by a pressure difference between an inlet and an outlet of the plurality of water pumps in parallel.

7. A non-transitory computer-readable storage medium with a computer program stored thereon, wherein the program when executed by a processor, implements a control method for the water pump in the air conditioning system according to claim 1.

8. A computer device, comprising a memory, a processor, and a computer program stored in the memory, wherein the computer program when executed by the processor, implements a control method for the water pump in the air conditioning system according to claim 1.

9. An air conditioning system, comprising:
   a plurality of water pumps in parallel; and
   a control apparatus for a water pump in the plurality of water pumps, comprising:
      a computer device, comprising a memory, a processor, and a computer program stored in the memory, wherein the computer program when executed by the processor, implements a control method for the water pump in the air conditioning system comprising:
         acquiring a number of the plurality of water pumps currently running in the air conditioning system, and a current rotation speed ratio and a current running lift of the water pumps;
         calculating a control range of a rotation speed ratio according to the number and the current running lift;
         determining whether the current rotation speed ratio is in the control range of the rotation speed ratio,
         switching the number of the plurality of water pumps to enable the rotation speed ratio of the water pumps to fall within the control range of the rotation speed ratio if the current rotation speed ratio is not in the control range of the rotation speed ratio; and controlling the water pumps currently running to continue synchronous frequency conversion and speed regulation if the current rotation speed ratio is in the control range of the rotation speed ratio.

\* \* \* \* \*